(12) United States Patent
Murphy et al.

(10) Patent No.: US 7,540,167 B2
(45) Date of Patent: Jun. 2, 2009

(54) CONDENSED WATER PRODUCTION SYSTEM

(76) Inventors: Dean Murphy, 29300 Fullerville Rd., Deland, FL (US) 32720; Norman P. Queiroga, 2432 Pacific Coast Hwy. Ste. 244, Lomita, CA (US) 90717

( * ) Notice: Subject to any disclaimer, the term of this patent is extended or adjusted under 35 U.S.C. 154(b) by 447 days.

(21) Appl. No.: 11/175,001

(22) Filed: Jul. 5, 2005

(65) Prior Publication Data
US 2006/0005561 A1   Jan. 12, 2006

Related U.S. Application Data

(60) Provisional application No. 60/586,416, filed on Jul. 8, 2004.

(51) Int. Cl.
  *F25D 21/14* (2006.01)
(52) U.S. Cl. .......................... 62/285; 62/291
(58) Field of Classification Search ............... 62/92, 62/272, 285, 291, 389
See application file for complete search history.

(56) References Cited

U.S. PATENT DOCUMENTS

| | | | |
|---|---|---|---|
| 4,780,424 A | 10/1988 | Holler et al. | |
| 5,301,516 A * | 4/1994 | Poindexter | 62/126 |
| 5,677,869 A | 10/1997 | Fazio et al. | |
| 5,751,637 A | 5/1998 | Chen et al. | |
| 5,845,504 A * | 12/1998 | LeBleu | 62/92 |
| 5,946,258 A | 8/1999 | Evertt et al. | |
| 6,018,186 A | 1/2000 | Hsu | |
| 6,020,241 A | 2/2000 | You et al. | |
| 6,028,324 A | 2/2000 | Su et al. | |
| 6,030,871 A | 2/2000 | Eitan | |
| 6,034,403 A | 3/2000 | Wu | |
| 6,063,666 A | 5/2000 | Chang et al. | |
| 6,137,718 A | 10/2000 | Reisinger | |
| 6,182,453 B1 * | 2/2001 | Forsberg | 62/125 |
| 6,209,337 B1 * | 4/2001 | Edwards | 62/272 |
| 6,330,192 B1 | 12/2001 | Ohba et al. | |
| 6,343,033 B1 | 1/2002 | Parker | |
| 6,346,442 B1 | 2/2002 | Aloni et al. | |
| 6,552,387 B1 | 4/2003 | Eitan | |
| 6,633,499 B1 | 10/2003 | Eitan et al. | |
| 6,700,818 B2 | 3/2004 | Shappir et al. | |
| 6,723,518 B2 | 4/2004 | Papsidero et al. | |

* cited by examiner

*Primary Examiner*—Melvin Jones
(74) *Attorney, Agent, or Firm*—Timothy H. Van Dyke; Beusse Wolter Sanks Mora & Maire

(57) ABSTRACT

Purified water production system from condensation of air humidity, system which is electronically controlled and composed of a appliance with an air entrance with filter; cold coil, for the condensation of air water vapor; collector and condensed water storage tank or primary storage tank, provided with a level sensor to recover the water condensed by the coil; purified water storage tank with level sensor for storing the water pumped from the primary storage tank and purified after going through the filter, ultra violet light, solid particles filter and, optionally, through a water structuring device.

15 Claims, 8 Drawing Sheets

CONDENSED WATER PRODUCTION SYSTEM

This application claims priority to U.S. Provisional Application Ser. No. 60/586,416 filed Jul. 8, 2004, incorporated herein by reference in its entirety.

BACKGROUND OF THE INVENTION

Even though water constitutes an essential good for people's physical and mental health, millions of people around the world still suffer with the unavailability of clean water appropriate for human consumption. Indeed, potable water is essential for human survival. However, in many environments, access to readily available sources of drinkable water is restricted if not precluded. Efforts have been made in the past to provide structures adapted to extract potable water from the environment, notable ambient air. Representative structures are those disclosed in U.S. Pat. No. 5,845,504 (LeBleu); U.S. Pat. No. 5,259,203 (Engel et al. And U.S. Pat. No. 5,669,221 (LeBleu et al).

While the aforesaid structures have contributed notably to the development of solutions to the provision of potable water in hostile environments, there continues to be a need for improved water generating devices. One problem associated with potable water generating machines is that the cooling means readily freezes over at relatively high temperatures. This eliminates practical usage for potable water generators during substantial times during the year, or renders them effectively useless in cooler regions. There remains a need for a water generating machine that effectively produces potable water even in colder regions. Furthermore, current systems are noisy which interferes with the enjoyment of the system, and in some cases prevents the practical usage in certain spaces.

SUMMARY OF THE INVENTION

According to one aspect, the subject invention pertains to a condensed water production system designed to produce liquid water by condensing humidity contained in air. According to this aspect, the system comprises a frame for housing various components of the system. Secured within the frame is a cooling coil which is cooled to point, by a change of state refrigerant system, wherein humidity in the air condenses onto the coil. Water condensed on the coil falls by gravity to a collector: By way of a conduit, which may comprise various interposing devices, the collector is connected to a water storage tank so as to be in fluid communication with said storage tank. The cooling coil has in close proximity to, or positioned amongst the coil, a heating element. The heating element allows for the continued generation of potable water from the air even if environmental air temperatures are cool.

Optionally, the system can be provided with a water-structuring device. In such case the system not only condenses and purifies water from air humidity, but promotes the structuring of the water as well, transforming it in structured water.

Structured water is a type of water present in healthy cells of human beings, which presents molecules with a higher energetic level than that of common water. Ingestion of structured water enhances all of the body functions at a cellular level, fighting disease and increasing immunity, thus increasing life expectancy.

The structuring device mentioned in this alternative of the present invention presents the characteristics described in the Brazilian patent document PI 03.02562-4 entitled "Process and equipment for the obtainment of structured water," deposited at INPI, whose inventor is Norman Queiroga.

These and other advantageous aspects of the present invention are described in further detail below.

DESCRIPTION OF THE INVENTION

Figure 1:
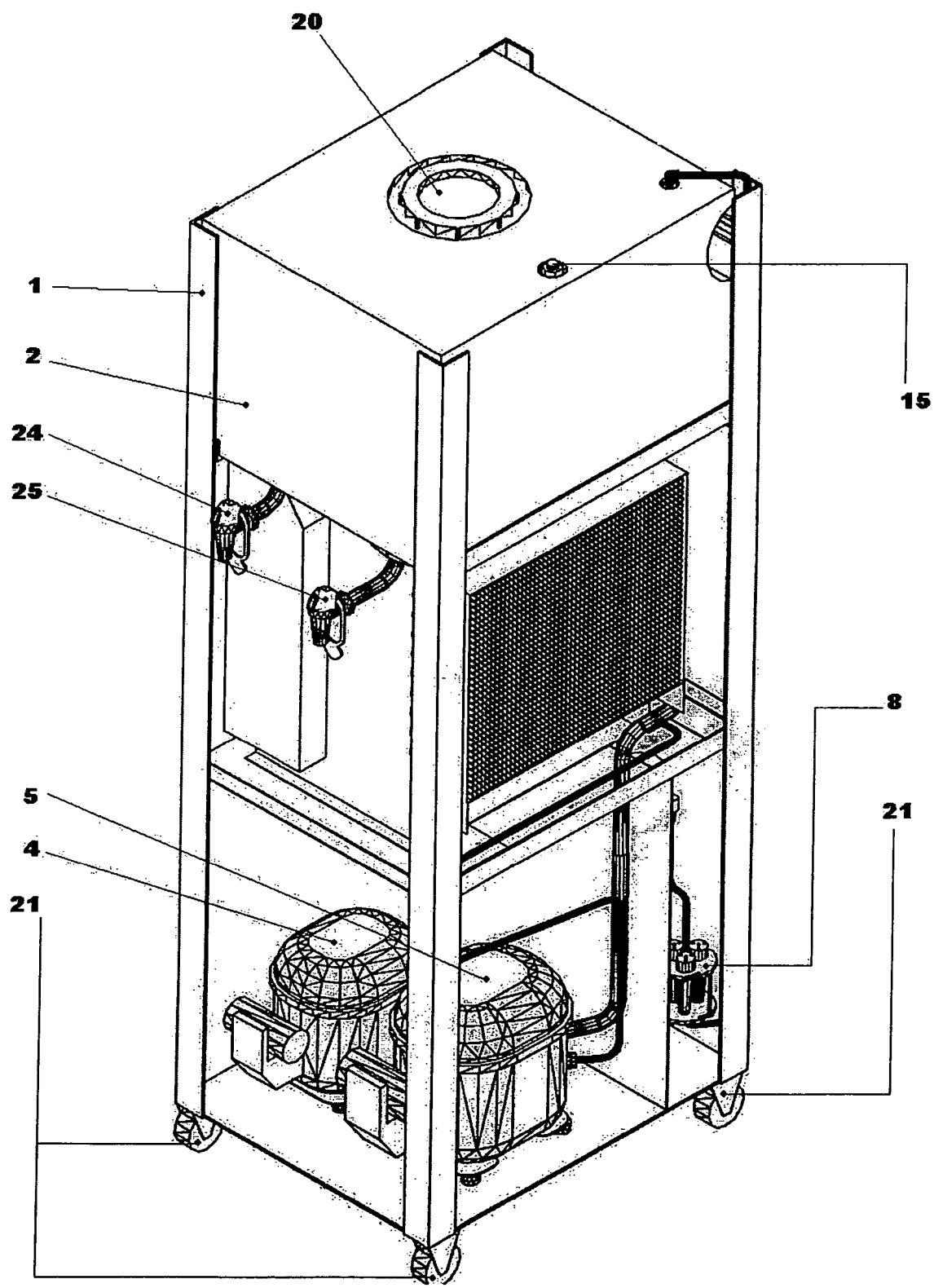
FIG. 1 shows a perspective view of one embodiment of the subject system with exterior covering removed.
Figure 2:
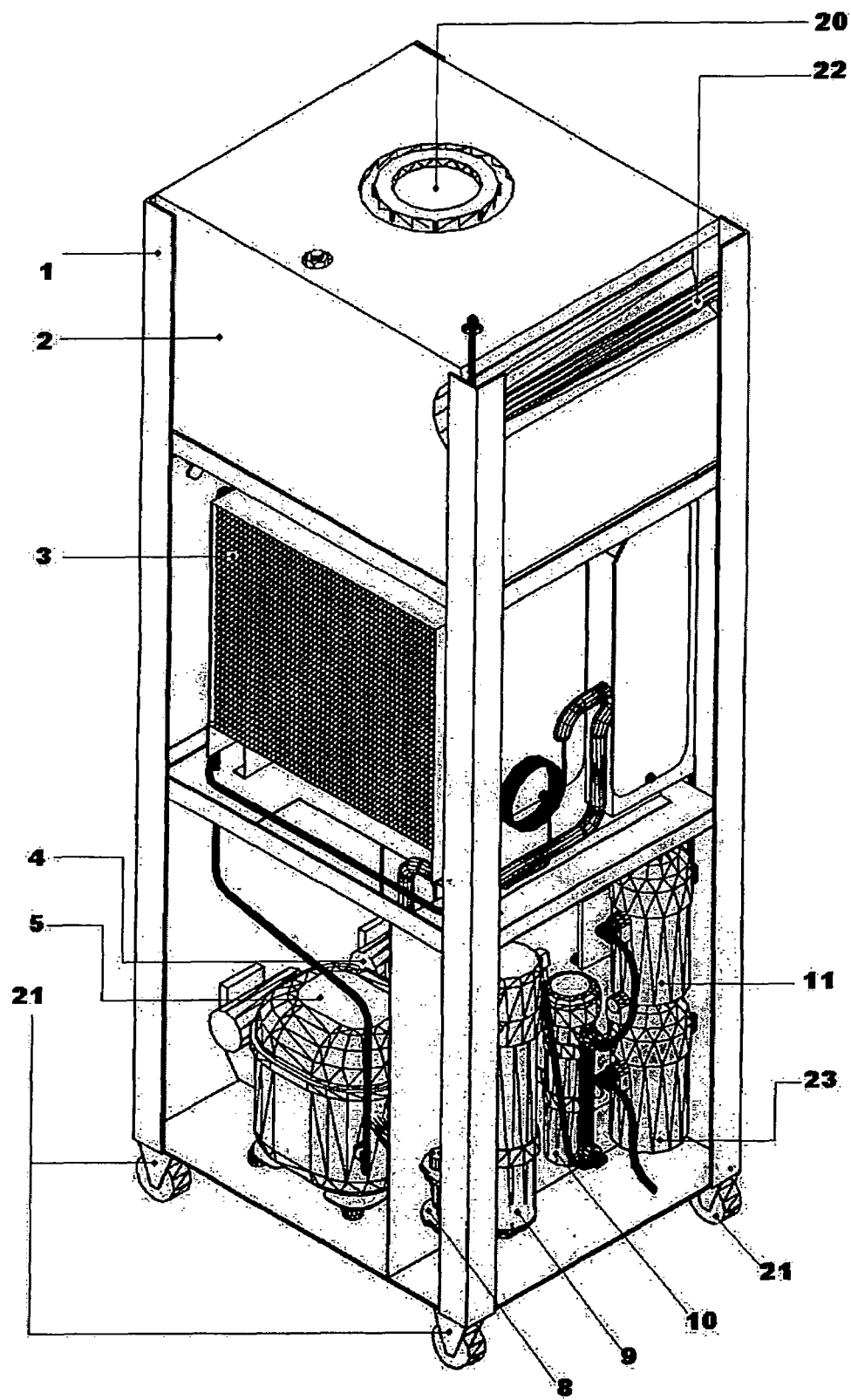
FIG. 2 shows a perspective view of the embodiment shown in FIG. 1 from a different angle.
Figure 3:
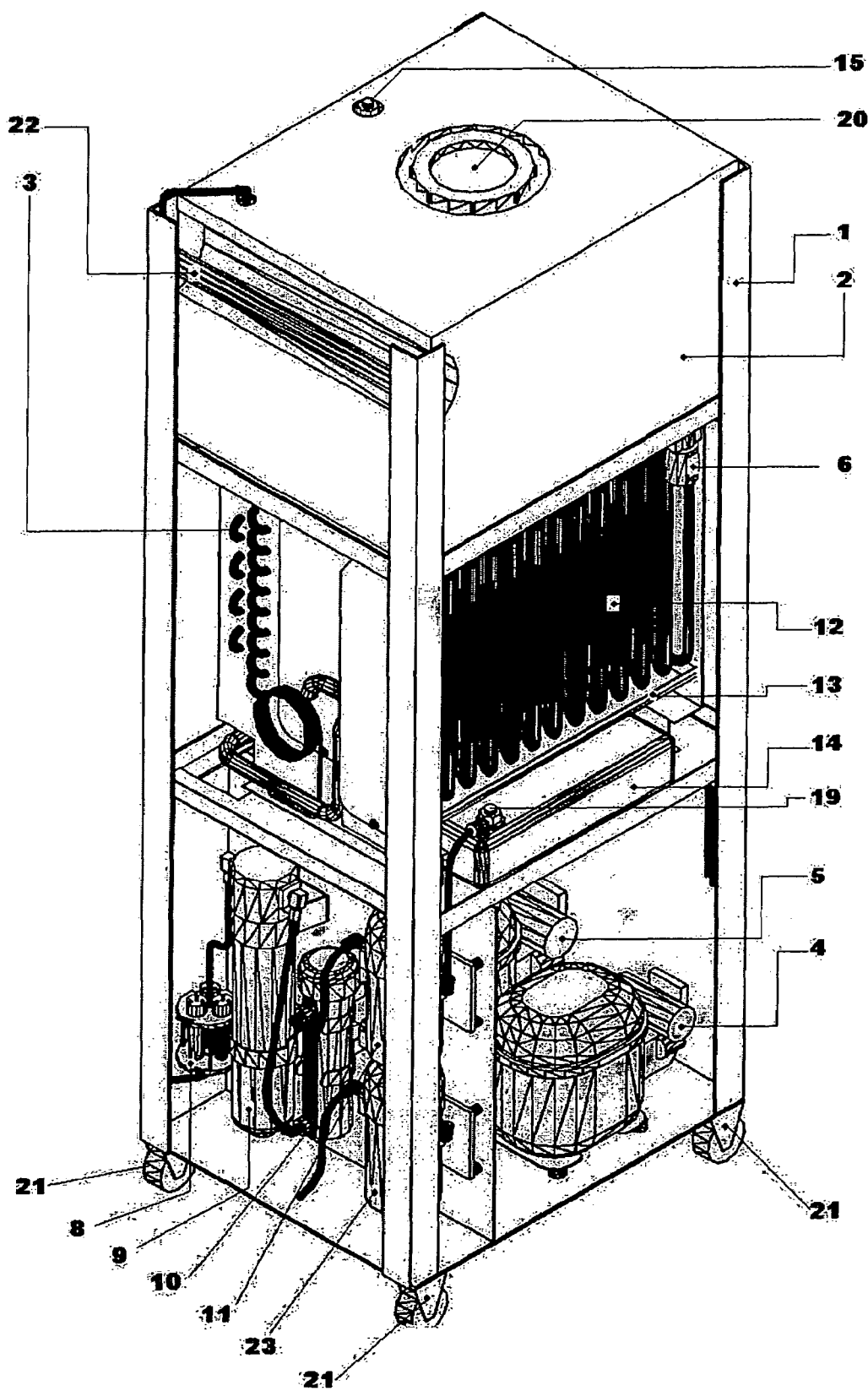
FIG. 3 shows a perspective view of the embodiment shown in FIG. 1 from a different angle.
Figure 4:
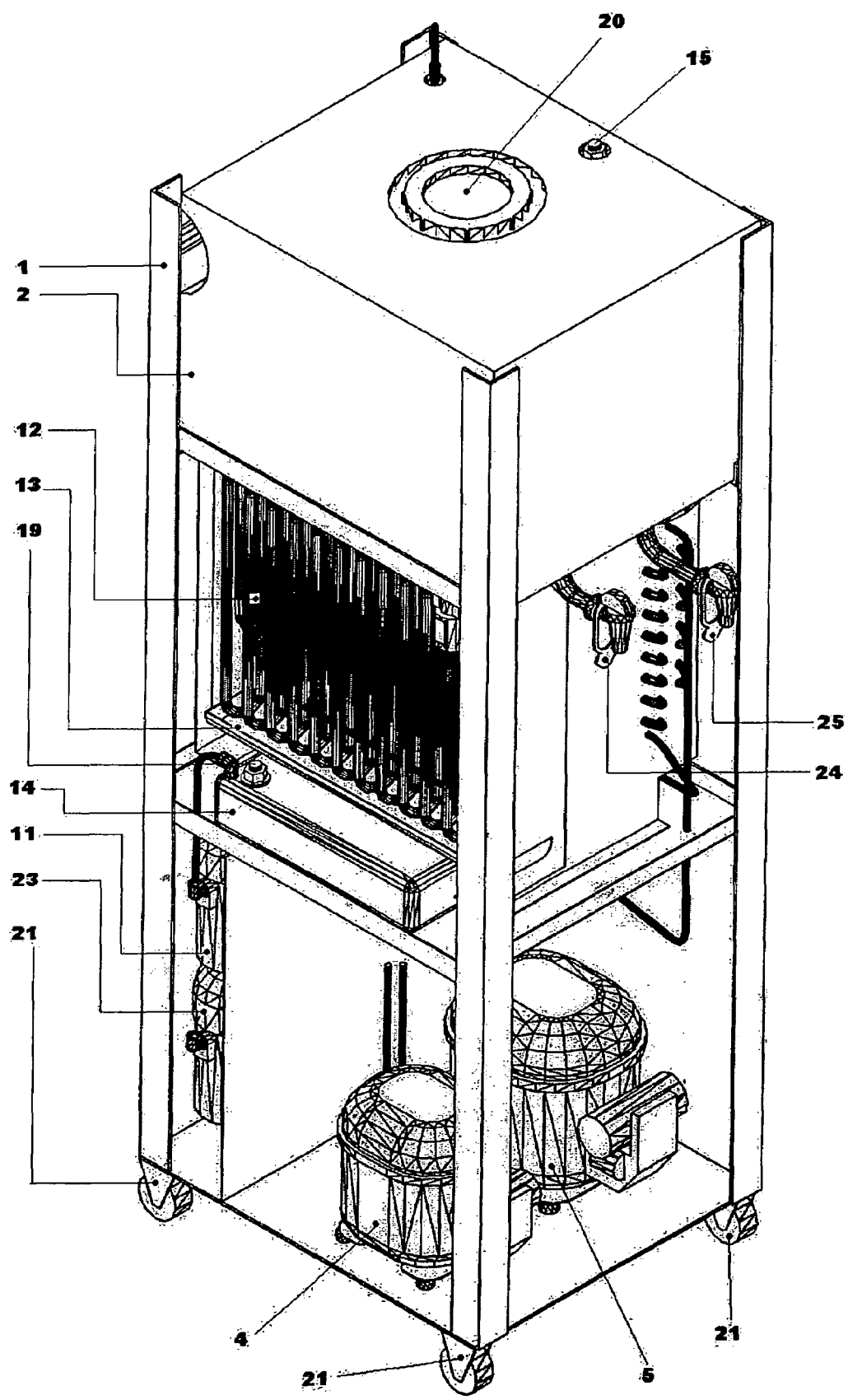
FIG. 4 shows a perspective view of the embodiment shown in FIG. 1 from a different angle.
Figure 5:
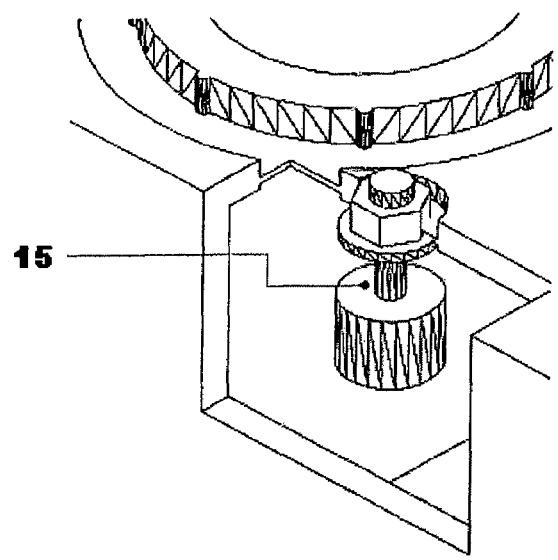
FIG. 5 shows a cut-away view an embodiment of the invention comprising a level sensor inside a double storage tank.
Figure 6:
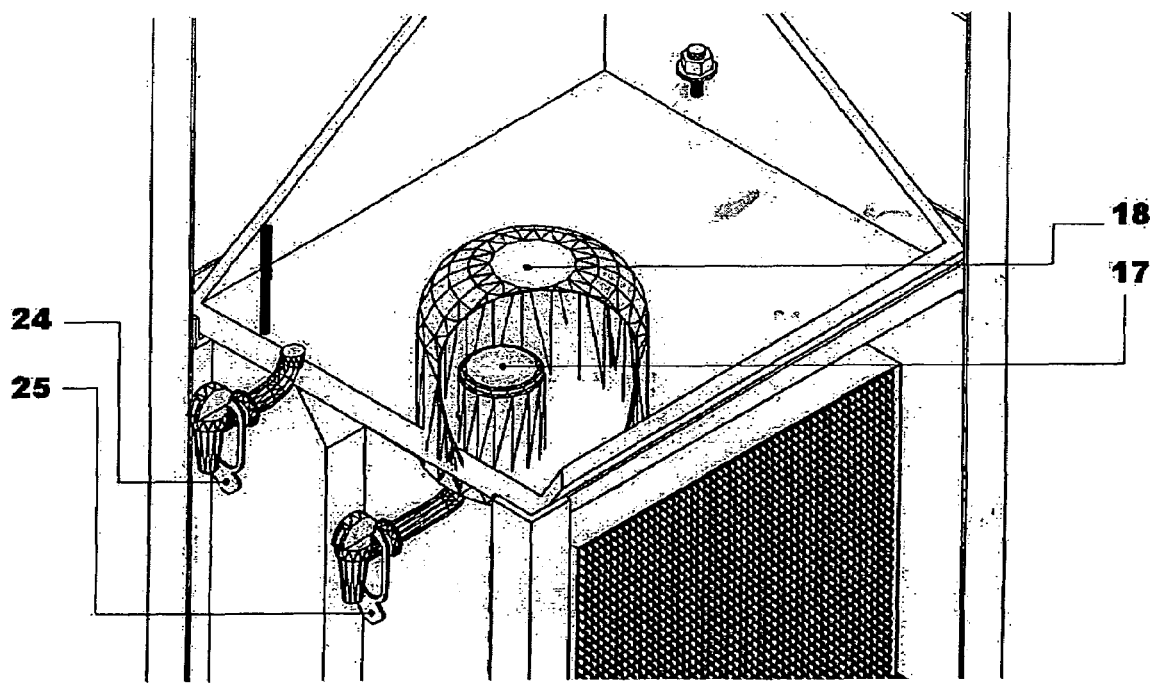
FIG. 6 shows a partial perspective view of a portion of one embodiment comprising a water cooler (or chilling unit) positioned inside a cold-water tank (or compartment) and the exits for dispensing room temperature water and cold water.
Figure 7:
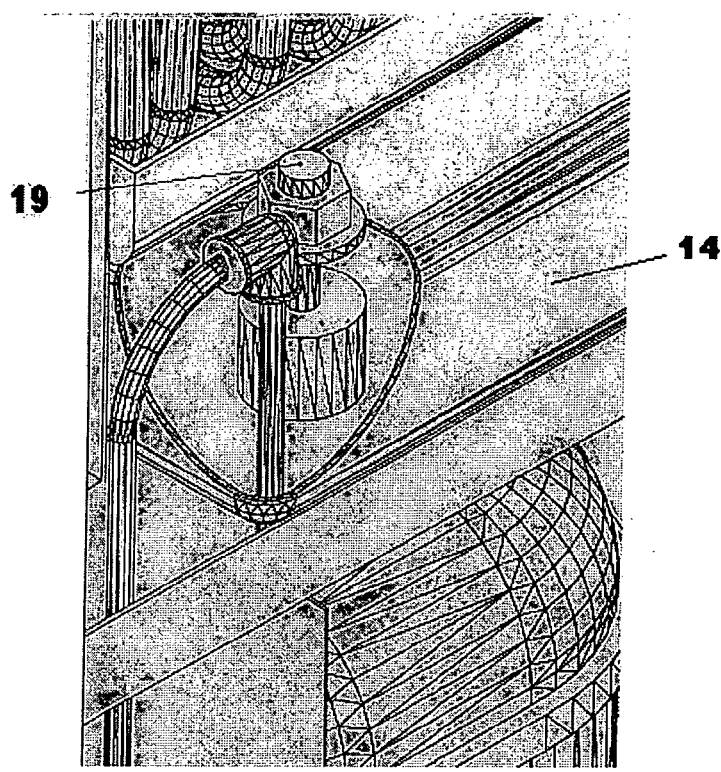
FIG. 7 shows a partial perspective view of another embodiment of the subject invention comprising a level sensor inside a primary storage tank and the water exit to the filtration pump.
Figure 8:
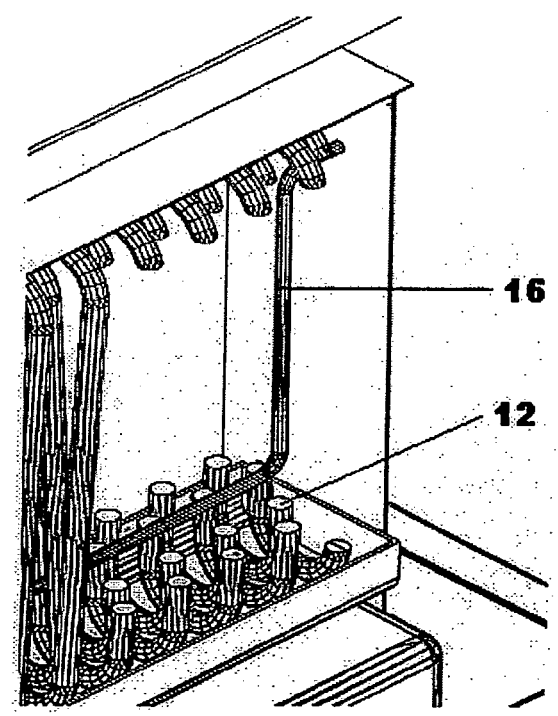
FIG. 8 shows cut-away view of an embodiment of a cooling coil with heating element positioned amongst the coil.
Figure 9:
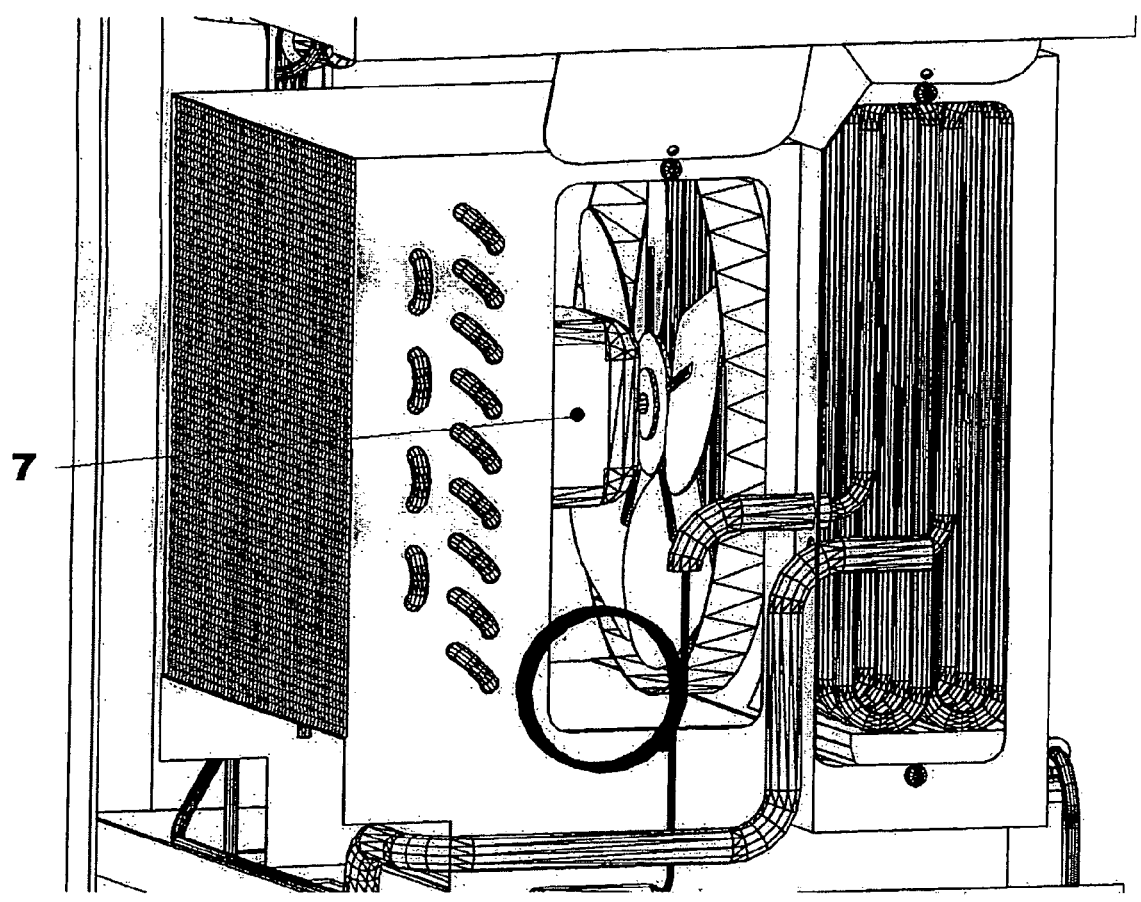
FIG. 9 shows a perspective view of a portion of an embodiment illustrating the positioning of the fan between the cooling coil and radiator assembly.

Referring to the attached FIGS. 1 through 9, a water condensing system embodiment is shown comprising a frame (1) with wheels (21) and a handle (22). In such frame (1) there is an air entrance system, which comprises an air filter and fan (7); an air cooling/condensation system, with cold coil (12), compressor (5), and radiator (3); condensed water purification system, with ultraviolet filter (10), solid particle filter (9), second storage tank for purified water (2, 18); purified water cooling system, with the water cooler (17), its respective compressor (4); water dispensing system; electronic control board. Note that the ultraviolet filter acts as a disinfecting unit and could be substituted for other disinfecting units, such as, but not limited to, ozone generator or chemical dispensing unit. Water formed on coil (12) falls via gravity to a condensed water collector (13) where it is then transferred to a primary water storage tank (14).

The term "fluid communication" as used herein refers to a connection between two or more elements, wherein such connection allows for the one-way or bi-directional flow of a fluid, whether in its liquid or gaseous form.

The system works as follows: By means of a fan (7) the ambient air, posterior to filtering, is admitted in the interior of the system while the humidity in it is condensed through the cold coil (12), collected by the collector (13) and stored in the primary water storage tank (14). The residual dry air is expelled from the system by the fan (7). The fan (7) is shown positioned between the coil (12) and the radiator assembly (3). This strategic positioning allows for the efficient flow of air through the system and also acts to muffle the noise created by the fan, due to blockage of sound by the coil (12), radiator assembly (3) and exterior walls (not shown). Prior art systems can be noisy making them less desired in quiet places, such as offices or homes. Furthermore, the coils are typically designed to be moved or positioned so the cleaning of the coils is possible from outside of the frame and then repositioned back into the system at the proper location. This can be accomplished by latches, pivoting means or other similar means, so long as the fluid communication of the coil with the compressor is not severed or irreversibly disrupted without recharging the refrigerant provided. In one embodiment, a door is provided on the system for accessing a replacing an air filter. The coils may be positioned immediately behind the air filter, such that when the air filter is removed, the coils may be accessed. The coils, typically made of a metal tubing, are configured such that the coil may be pivoted out of the frame through the air filter doorway. The coil is designed such that the pivot point of the coil occurs over a range of 1-10 inches, or more, so as to minimize torsional forces on a focused portion of the coil tubing.

The radiator assembly (3) of the subject system is unique in that it combines heat transfer for both the water cooling compressor (4) and air condensation compressor (5) systems. The radiator assembly (3) comprises tubes in fluid communication with both systems. This allows for maximization of space within the system, as well as efficient heat transfer for both compressors.

The primary water storage tank (14) has a level sensor (15), which creates a signal when the condensed water reaches its maximum level, whereby the pump (11) is actuated to direct flow of collected water through the ultraviolet filter (10), and solid particles filter (9), and ultimately to the main purified water tank (2) located in the top section of the condensation system. Note that the pump and filter sequence may be varied.

The main storage tank (2) contains, in its interior, a cold-water storage compartment (18) wherein cold water is produced by chilling unit (17). The chilling unit comprises a heat exchanger (not shown). From these storage tanks (2 and 18) the water flows to the room temperature and cold water disposal valves (24 and 25), respectively. Furthermore, according to another embodiment, the water storage tank comprises a drain which would allow water to flow out of the tank (2), at a predetermined level, to provide water to a remote location. One example of this would be for use in a boat or motorhome, or other vehicle or structure comprising its own water storage tank, wherein the system is used to generate water and passively fill a water storage tank on said boat, motor home, or other vehicle or structure. The remote storage tank can be equipped with a sensor so that when it reaches a desired fullness, it triggers a remote valve to stop flow from the main storage tank to the remote storage tank.

The purified water storage tank or second storage tank (2), which has a lid (20) to allow it's cleaning, also presents a level sensor (19). Every time the water reaches its maximum level, the sensor shuts the water off and the water is drained to the collector (13) through the solenoid valve (6) repeating the purification cycle, providing continued recycling, if desired.

The cooling/condensation system also comprises a heating element (16) that, controlled by a sensor, promotes, when needed, the defrosting of the ice on the coil (12). This allows efficient production of potable water at temperatures of 20° F. and above, and more preferably, at 32° F. and above.

In case of the rendering of the alternative in which the machine contains a structuring device (8), when the water form the primary tank (14) reaches the maximum level and is pumped to the main storage tank (2), it also goes through the structuring device (13) before it reaches the afore mentioned storage tank (2).

In an alternative embodiment, the system comprises an additional pump (23) in fluid communication with the main storage tank (2). This pump directs water from the storage tank (2) to a remote location. One example of use of this alternate embodiment is the provision of water to a sink, refrigerator, ice machine or other dispensing location within a building or home. Water is produced outside the building or home, where humidity is generally higher to optimally produce water, and then delivered to the source of need. For most applications of this embodiment, a chilling unit and cold water storage compartment for the system will not be needed.

The condensing system can still be provided with a system, which allows for coin or dollar bill operation. As in other coin-operated machines, in this alternate version of the invention there will be a coin slot and a bill slot, change dispenser and a cup holder.

Figure 10:
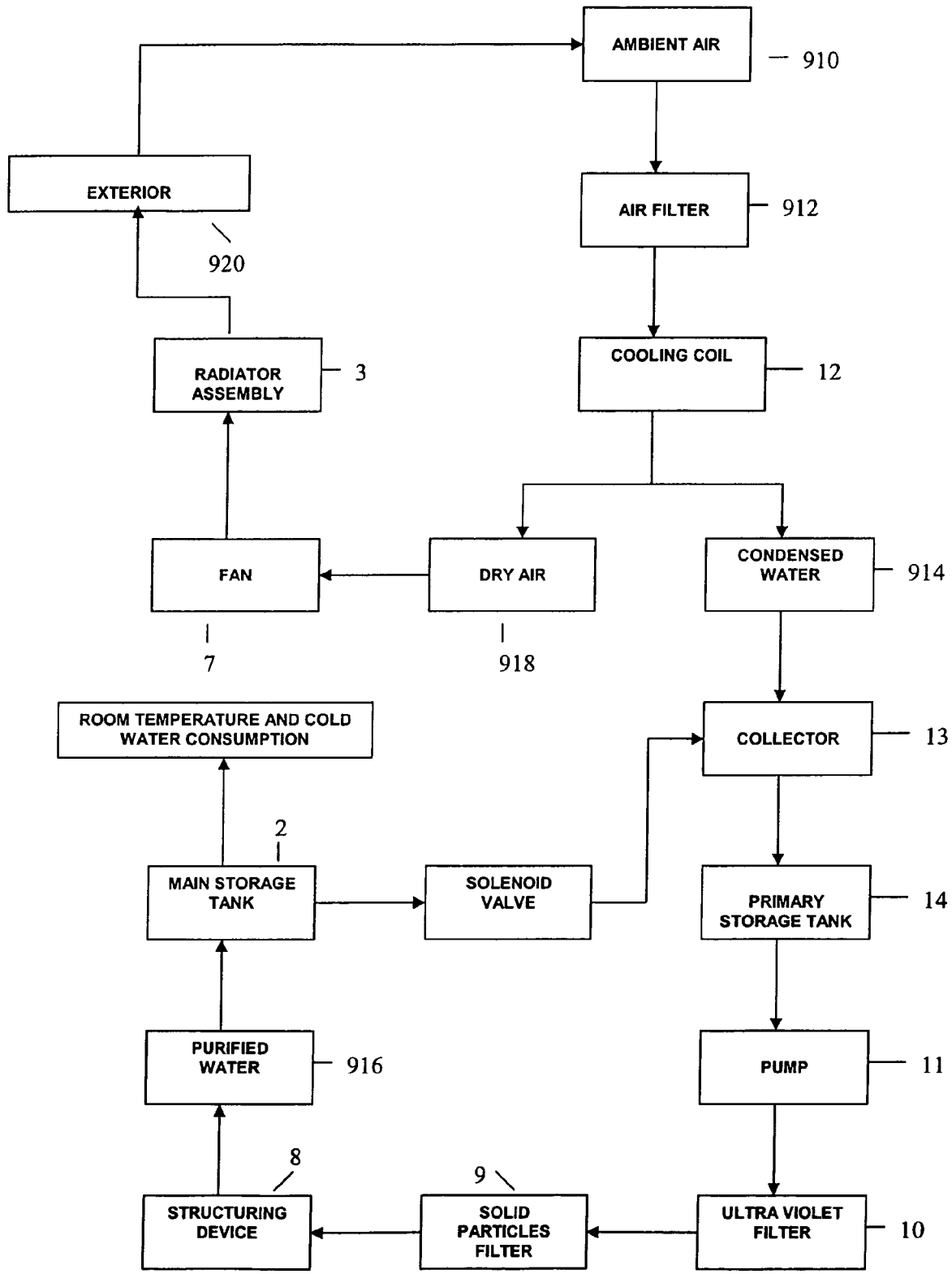
FIG. 10 shows an illustrative flowchart of the operations performed in the condensation system.

FIG. 10 shows a diagram of a typical arrangement of the components of an embodiment of the subject water condensation system (900). Ambient air (910) enters the system (900) through air filter (912). The ambient air (910) contacts the cooling coil (12) whereby humidity in the air condenses to form condensed water (914) and is collected by collector (13). From the collector (13), water (914) travels into a primary storage tank (14). Pump (11) directs water (914) from the primary storage tank (14) to an ultraviolet filter (10), which from there is directed to a solid particle filter (9) and optionally a water structuring device (8) to then form purified water (916). Through purified water (916) is then directed to the main storage tank (2). The purified water (916) may then be dispensed from the main storage tank (2), or upon reaching a certain level, recycled through the purifying process by actuating solenoid valve (6).

Dry air (918) formed after the condensing of the water is pulled through the system (900) by fan (7) and pushed across the radiator assembly (3) and to the exterior (920) of the system (900).

Noted Considerations

The teachings of the references cited throughout the specification are incorporated herein in their entirety by this reference to the extent they are not inconsistent with the teachings herein. It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A condensed water production system designed to produce liquid water by condensing humidity contained in air, said system comprising:

a frame;

at least one cooling coil disposed within said frame;

a collector positioned under said cooling coil;

at least one compressor in fluid communication with said cooling coil;

a radiator assembly comprising at least one tube in fluid communication with said first compressor and at least one tube in fluid communication with said cooling coil;

a water storage tank in fluid communication with said collector;

a disinfecting unit interposed between said collector and said water storage tank, such that water transferred from said collector passes through said disinfecting unit before entering said water storage tank; and a heating element proximate to or amongst said at least one cooling coil to effect defrosting of said at least one cooling coil; wherein, due to the placement of said heating element, said system may operate at environmental temperatures of about 20° F. and above.

2. The system of claim 1 wherein the system may operate at environmental temperatures of 32° F. and above.

3. The system of claim 1 further comprising a fan positioned between said at least one cooling coil and said radiator assembly such that said fan pulls air through said coil and pushes air out through said radiator assembly, whereby noise produced by said fan is muffled by being positioned between said at least one cooling coil and said radiator assembly.

4. A condensed water production system designed to produce liquid water by condensing humidity contained in air, said system comprising:
a frame;
at least one cooling coil disposed within said frame;
a collector positioned under said cooling coil;
a first compressor in fluid communication with said cooling coil;
a radiator assembly comprising at least one tube in fluid communication with said first compressor and at least one tube in fluid communication with said cooling coil;
a water storage tank in fluid communication with said collector;
a disinfecting unit interposed between said collector and said water storage tank, such that water transferred from said collector passes through said disinfecting unit before entering said water storage tank;
a cold water storage compartment comprising a chilling unit therein; and
a second compressor in fluid communication with said chilling unit, wherein said radiator assembly has at least one tube in fluid communication with said chilling unit and at least one tube in fluid communication with said second compressor.

5. The system of claim 4, further comprising a heating element proximate to or amongst said at least one cooling coil to effect defrosting of said at least one cooling coil.

6. The system of claim 4, wherein said disinfecting unit is an ultraviolet filter.

7. The system of claim 4, further comprising a fan positioned between said at least one cooling coil and said radiator assembly such that said fan pulls air through said coil and pushes air out through said radiator assembly, whereby noise produced by said fan is muffled by being positioned between said at least one cooling coil and said radiator assembly.

8. The system of claim 4, further comprising a pump interposed between said collector to said water storage tank so as to direct water from said collector to said water storage tank.

9. The system of claim 4, further comprising a solid particle filter interposed between and in fluid communication with said collector and said water storage tank.

10. The system of claim 4, further comprising a pump, disinfecting unit, and solid particle filter in fluid communication with each other and interposed between, and in fluid communication, with said collector and said water storage tank.

11. The system of claim 10, wherein said water storage tank has a first exit for dispensing water and a second exit for draining water back into said collector whereby water is freshened by cycling through said disinfecting unit and said solid particle filter.

12. The system of claim 11, further comprising a solenoid valve downstream from said second exit, wherein said solenoid valve is configured for actuating draining of water back into said collector.

13. A condensed water production system designed to produce liquid water by condensing humidity contained in air, said system comprising:
a frame;
at least one cooling coil disposed within said frame;
a collector positioned under said cooling coil;
at least one compressor in fluid communication with said cooling coil;
a radiator assembly comprising at least one tube in fluid communication with said first compressor and at least one tube in fluid communication with said cooling coil;
a primary storage tank for holding water downstream from said collector;
a main water storage tank in fluid communication with said primary storage tank, wherein said main water storage tank comprises an exit;
a disinfecting unit interposed between said collector and said water storage tank, such that water transferred from said collector passes through said disinfecting unit before entering said water storage tank;
a first pump interposed between said primary storage tank and said main water storage tank so as to direct water flow from said primary storage tank to said main water storage tank;
a second pump in fluid communication with said water storage tank so as to direct water from said exit of said water storage tank to a remote location; and
a heating element proximate to or amongst said at least one cooling coil to effect defrosting of said at least one cooling coil.

14. The system of claim 13, further comprising a cold water storage compartment comprising a chilling unit therein; and a second compressor in fluid communication with said chilling unit, wherein said radiator assembly has at least one tube in fluid communication with said chilling unit and at least one tube in fluid communication with said second compressor.

15. The system of claim 13, further comprising a solid particle filter, wherein said first pump, said disinfecting unit, and said solid particle filter are in fluid communication with each other, and interposed between, and in fluid communication, with said collector and said main water storage tank.

* * * * *